(12) United States Patent
Trawick

(10) Patent No.: US 11,380,945 B2
(45) Date of Patent: Jul. 5, 2022

(54) RECUPERATIVE BATTERY COOLING SYSTEM AS EMERGENCY POWER SOURCE

(71) Applicant: Rolls-Royce North American Technologies Inc., Indianapolis, IN (US)

(72) Inventor: David R. Trawick, Indianapolis, IN (US)

(73) Assignee: ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 224 days.

(21) Appl. No.: 16/168,942

(22) Filed: Oct. 24, 2018

(65) Prior Publication Data

US 2020/0136202 A1 Apr. 30, 2020

(51) Int. Cl.
| | |
|---|---|
| *H01M 10/613* | (2014.01) |
| *H01M 10/6568* | (2014.01) |
| *B60L 58/21* | (2019.01) |
| *B60L 58/26* | (2019.01) |
| *H01M 50/20* | (2021.01) |

(52) U.S. Cl.
CPC .......... *H01M 10/613* (2015.04); *B60L 58/21* (2019.02); *B60L 58/26* (2019.02); *H01M 10/6568* (2015.04); *H01M 50/20* (2021.01)

(58) Field of Classification Search
CPC ............ B60H 1/00278; H01M 10/613; H01M 10/6568
See application file for complete search history.

(56) References Cited

U.S. PATENT DOCUMENTS

| | | | | |
|---|---|---|---|---|
| 9,649,909 | B2* | 5/2017 | Enomoto | B60K 6/22 |
| 2013/0071701 | A1* | 3/2013 | LePort | H01M 10/613 |
| | | | | 429/50 |
| 2013/0269911 | A1* | 10/2013 | Carpenter | B60L 50/61 |
| | | | | 165/104.13 |
| 2014/0077508 | A1* | 3/2014 | Prokopich | B60L 50/11 |
| | | | | 290/1 R |

(Continued)

OTHER PUBLICATIONS

Perullo, Christopher A. et al., "An Integrated Assessment of an Organic Rankine Cycle Concept for use in Onboard Aircraft Power Generation," Proceedings of ASME Turbo Expo 2013: Turbine Technical Conference and Exposition, Jun. 3-7, 2013, San Antonio, Texas, Paper No. GT2013-95734, 8 pages.

(Continued)

Primary Examiner — Sarah A. Slifka
Assistant Examiner — Rachel L Zhang
(74) Attorney, Agent, or Firm — Crowell & Moring LLP

(57) ABSTRACT

A thermal management system and method for regulating the dissipation of a thermal load during operation of a vehicle. The thermal management system including one or more cooling loops configured to regulate the temperature of at least one battery pack; and an energy recovery mechanism configured to recover energy dissipated upon the occurrence of a thermal runaway event. The amount of energy recovered maintains the power level at or above the level exhibited by the battery pack prior to the occurrence of the thermal runaway event. Upon the occurrence of the thermal runaway event, the energy recovery mechanism transforms the cooling loop into a Rankine cycle loop or uses a Seebeck effect to recover energy.

17 Claims, 4 Drawing Sheets

(56) References Cited

U.S. PATENT DOCUMENTS

2016/0272084 A1* 9/2016 Chuang .............. H01M 10/625
2016/0339759 A1* 11/2016 Zhou .................. H01M 10/613

OTHER PUBLICATIONS

Xu, Jian et al., "Prevent Thermal Runaway of Lithium-Ion Batteries with Minichannel Cooling," Applied Thermal Engineering, vol. 110 (2017), pp. 883-890.

* cited by examiner

RECUPERATIVE BATTERY COOLING SYSTEM AS EMERGENCY POWER SOURCE

TECHNICAL FIELD

This disclosure relates generally to recuperative battery cooling systems. More specifically, this disclosure relates to a thermal management system that incorporates an energy recovery mechanism.

BACKGROUND

The statements in this section merely provide background information related to the present disclosure and may not constitute prior art.

The use of lithium ion batteries for aircraft propulsion systems contains inherent tradeoffs, such as the low energy density of the batteries as compared to fuel, as well as the compromises that may be made relative to the thermal stability of the battery in order to increase its energy density. A reduction in thermal stability may cause the battery to fail and enter thermal runaway, thereby reducing the available electric power and starting an onboard fire.

Thermal runaway is a condition in which the battery temperature rises due to the occurrence of a chemical reaction that accelerates as the temperature increases. This cumulative action may lead to catastrophic degradation of the battery if appropriate action is not taken. Even though the occurrence of thermal runaway is a rare event, the occurrence of such an event may lead to fire and/or an explosion in addition to a total loss of power. The energy, which would have propelled the vehicle is rapidly expended generating a fire in the battery. The combination of a fire and a loss of propulsive power can be prohibitive to the operation of a vehicle, especially in an aircraft designed for vertical take-off and landing (VTOL).

DRAWINGS

In order that the disclosure may be well understood, there will now be described various forms thereof, given by way of example, reference being made to the accompanying drawings, in which.

Figure 1A:
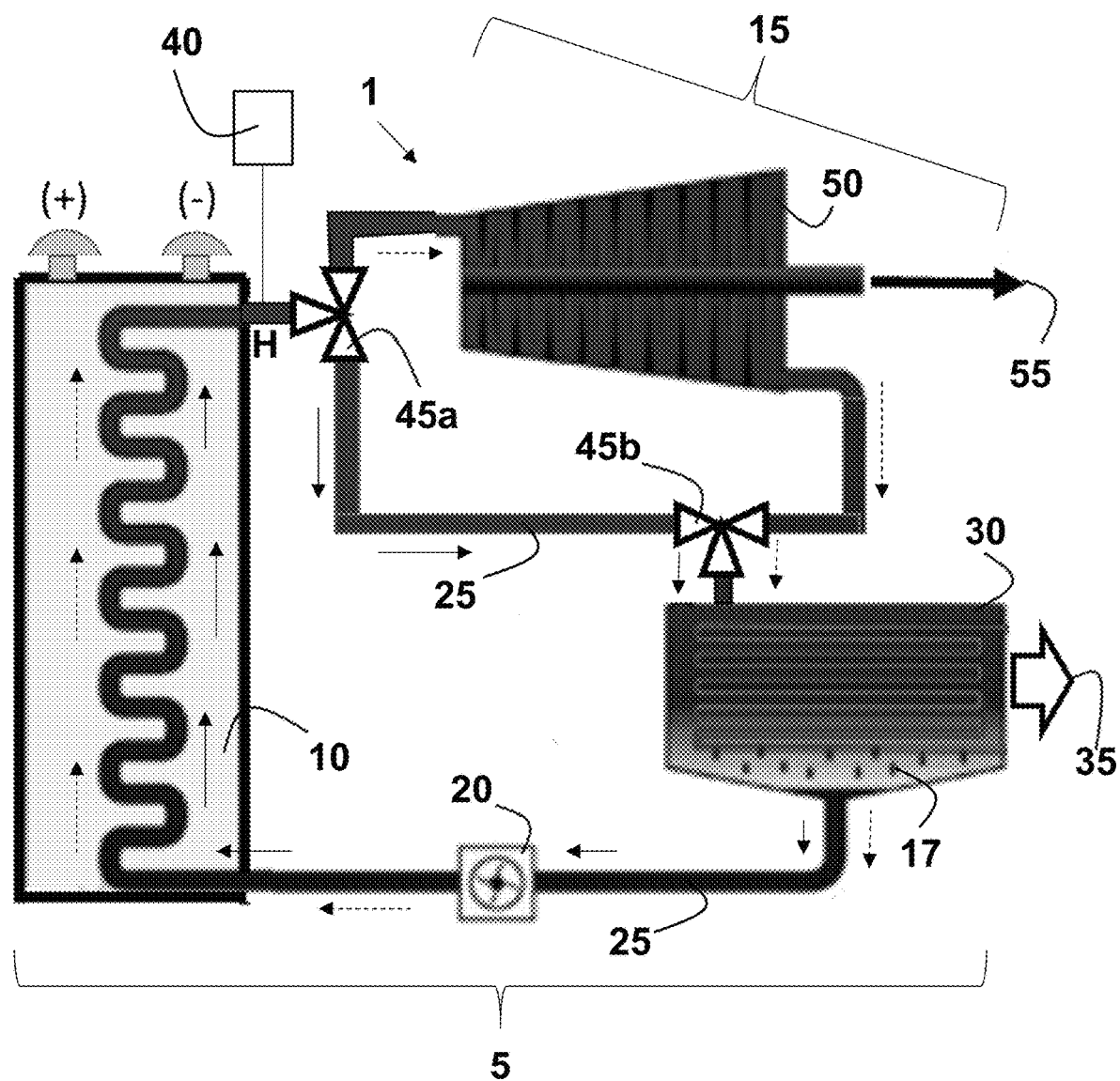
FIG. 1a is a schematic representation of a thermal management system to regulate the dissipation of a thermal load during operation of a vehicle according to the teachings of the present disclosure.

The drawings described herein are for illustration purposes only and are not intended to limit the scope of the present disclosure in any way.

DETAILED DESCRIPTION

The present disclosure generally provides a thermal management system that that incorporates an energy recovery mechanism with a cooling loop. This thermal management system may be used in a primary mode to keep a battery pack cool, thereby making the occurrence of a thermal runaway event less likely. In addition, in the event of a thermal runaway event, the thermal management system may also capture the thermal energy be lost and use it to generate power during this state of emergency. The thermal runaway event releases all the remaining energy in the battery at a high rate, and therefore an energy recovery mechanism coupled with a cooling loop in the thermal management system could recover energy at a lower efficiency and still maintain the power level that the battery would have produced if discharged at its normal lower rate.

The amount of time over which the captured thermal energy can be used to power the vehicle's systems should be long enough to bring the vehicle to a safe resting state, e.g., facilitate an emergency landing of an aircraft. This time period may range from a matter of minutes to multiple hours; alternatively, between 5 minutes and 48 hours; alternatively, for greater than 30 minutes; alternatively, for at least 1 hour; alternatively, for greater than 3 hours; alternatively, between 15 minutes and 24 hours.

The following description is merely exemplary in nature and is in no way intended to limit the present disclosure or its application or uses. For example, the thermal management system made and used according to the teachings contained herein is described throughout the present disclosure in conjunction with distributing electrical power to various components in an aircraft in order to more fully illustrate the functionality of the system and the use thereof. The incorporation and use of such a thermal management system in other industrial and military applications that may include any vehicle that contains one or more components, which consume electricity, are contemplated to be within the scope of the present disclosure. Several examples of such vehicles include, without limitation, automobiles, trucks, tractors, heavy machinery, boats, ships, trains, satellites, spaceships, or the like. The terms "vehicle" or "vehicles" as used herein is intended to incorporate each of these possible applications and to be synergistic therewith.

For the purpose of this disclosure the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one source", "one or more sources", and "source(s)" may be used interchangeably and are intended to have the same meaning.

For the purpose of this disclosure, the term "temperature control" describes controlling a temperature with minimal variation, such as ±5° C.; alternatively, ±3° C.; alternatively, ±1° C.; alternatively, ±0.5° C. When desirable, this control over the variation in temperature may also be expressed as a percentage of the measured temperature. For example, as the measured temperature is controlled to be within ±10%; alternatively, ±5%; alternatively, ±3%; alternatively, ±1%.

For purposes of promoting an understanding of the principles of the present disclosure, reference will now be made to the embodiments illustrated in the drawings, and specific language will be used to describe the same. It should be understood that throughout the description, corresponding reference numerals indicate like or corresponding parts and features. One skilled in the art will further understand that any properties reported herein represent properties that are routinely measured and may be obtained by multiple different methods. The methods described herein represent one such method and other methods may be utilized without exceeding the scope of the present disclosure.

No limitation of the scope of the present disclosure is intended by the illustration and description of certain embodiments herein. In addition, any alterations and/or modifications of the illustrated and/or described embodiment(s) are contemplated as being within the scope of the present disclosure. Further, any other applications of the principles of the present disclosure, as illustrated and/or described herein, as would normally occur to one skilled in the art to which the disclosure pertains, are contemplated as being within the scope thereof.

Figure 1B:
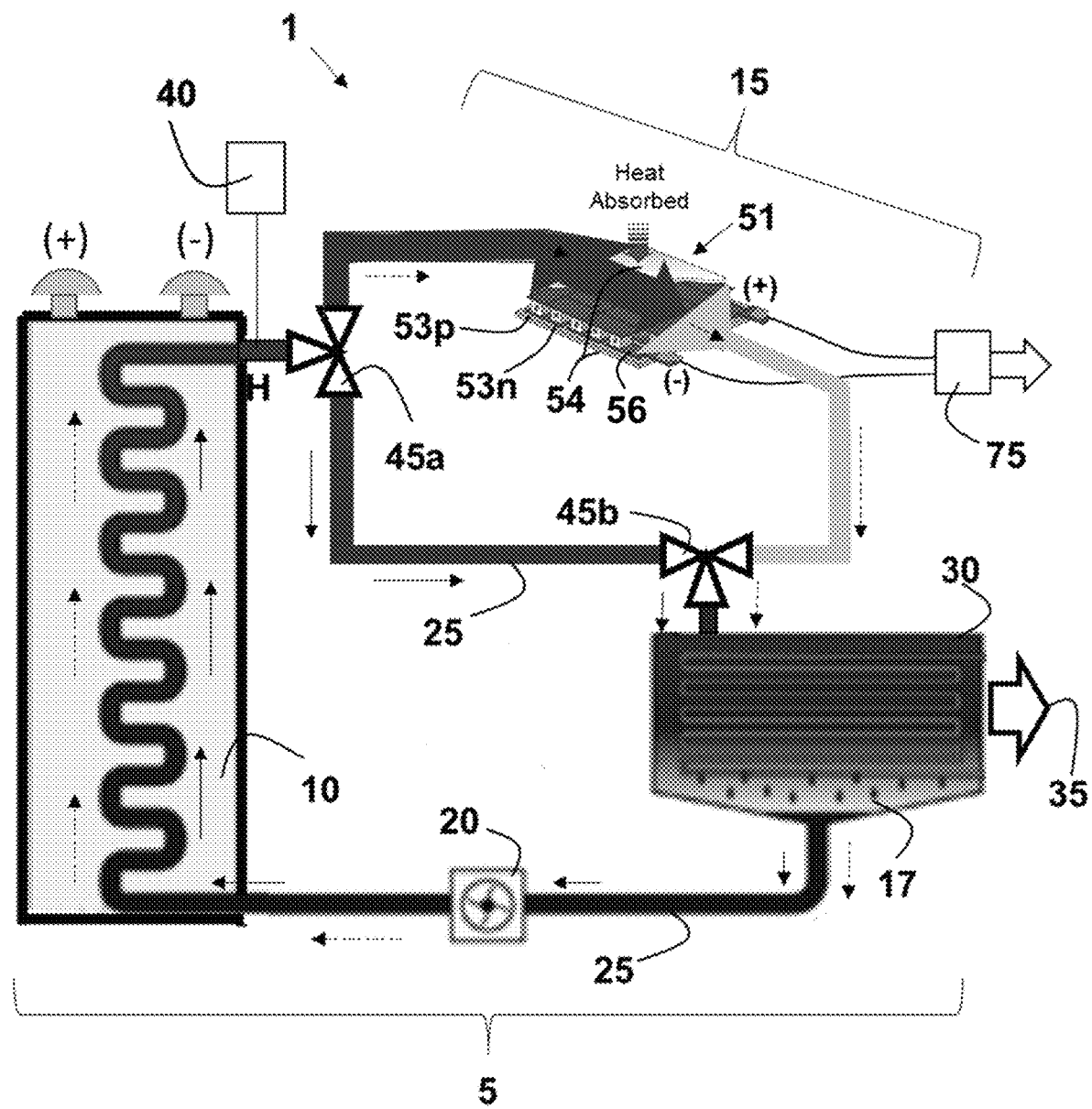
FIG. 1b is a schematic representation of another thermal management system constructed according to the teachings of the present disclosure.

Referring to FIGS. 1a and 1b, a thermal management system 1 is provided that generally comprises one or more cooling loops 5 configured to regulate the temperature of at least one battery pack 10 and an energy recovery mechanism 15 configured to recover energy dissipated upon the occurrence of a thermal runaway event. The amount of energy recovered maintains the power level at or above the level exhibited by the battery pack 10 prior to the occurrence of the thermal runaway event.

When the temperature of the battery pack is elevated and the heat cannot dissipate effectively, thermal runaway due to exothermic reactions can occur. Thermal runaway involves a rapid temperature increase accompanied by a loss in the power output by the battery pack. Thermal runaway may also release gas, smoke, fire, and an explosion. There are numerous external and internal abuse conditions that can cause thermal runaway, e.g., external heating, over charging/discharging, and an external short, to name a few.

During normal operation, the thermal management system 1 uses a circulation pump 20 to circulate or force fluid to flow through one or more hoses 25 in the cooling loop 5 (see FIGS. 1a & 1b, solid arrows) from the battery pack 10 to a heat exchanger 30 and back to the battery pack 10. During normal operation, the fluid 17 flowing through the hoses 25 absorbs heat from battery pack 10. This absorbed heat is removed from the fluid and dissipated 35 to the environment when the fluid flow through the heat exchanger 30. The cooling loop 5 in the thermal management system 1 of the present disclosure can provide for enhanced operating performance efficiency by quickly ensuring that the battery pack is operating in the "battery comfort zone" or near optimum operating temperatures. In other words, the cooling loop 5 is configured to precisely control the operating temperature to be within the battery pack's temperature limits.

The fluid used to absorb and dissipate heat in the cooling loop 5 and used in the energy recovery mechanism 15 is generally water. The water may when desirable comprise one or more additives, such as corrosion inhibitors, bactericides, fungicides, antifouling agents, etc., that provide additional functionality to the fluid.

During normal operation, the pump may operate a variable speed in order to maintain the battery pack within the desired temperature range, i.e., provide temperature control at or near a predetermined temperature. Since the thermal load generated by the absorption of heat from the battery pack is variable and the battery pack has a minimum temperature limit for efficient operation and/or to extend the lifetime, the thermal management system is constrained not to operate below the minimum temperature limit, while the cooling loop is designed to maintain the battery pack below a maximum temperature limit.

Rapid aging occurs when the battery pack is operated at too high of a temperature (e.g., above about 70° C.). In addition, accelerated aging may also occur when the battery pack is operated in the range of about 50° C. to about 70° C. When the battery pack is operated at or below 0° C. degradation of the batteries, e.g., lithium plating, dentrite formation, etc. may occur. When the battery pack is operated at a temperature ranging from 0° C. to about 10° C., the battery pack exhibits a reduced energy or power capacity. The occurrence of accelerated aging, pack charge imbalance, reduced energy/power capacity, or chemical degradation is undesirable. The temperature range, which may be considered the "comfort zone" for the operation of the battery pack is in the range from about 10° C. to about 50° C. In addition, a minimal change in temperature ($\Delta T$) over the entire battery pack is desirable in order to minimize the occurrence of a charge imbalance occurring in the battery pack. In this respect, the change in temperature over the entire battery pack should be less than 5° C.; alternatively, less than about 4° C.; alternatively between 0° and about 3° C.

Still referring to FIGS. 1a and 1b, the thermal management system 1 may include one or more control units 40. These control units 40 may be dedicated to the thermal management system 1 or be incorporated as part of the vehicle's main control system, thereby reducing manufacturing cost and overall vehicle complexity. The control units 40 may use a plurality of sensors (not shown) that are capable of monitoring the temperature and/or pressure within the hose 25 in one or more regions of the cooling loop 5 or energy recovery mechanism 15. Control units 40 can use the measured temperature values to determine the operation of the various thermal management subsystems 5, 15.

The control units 40 may include any means of control known to one skilled in the art that performs logic operations. The control units or controller 40 may be in communication with a memory (not shown). Alternatively or in addition, the control units 40 may be in communication with multiple components within the thermal management system 1. The control units 40 may include a general processor, a central processing unit, a server device, an application specific integrated circuit (ASIC), a digital signal processor, a field programmable gate array (FPGA), a digital circuit, an analog circuit, a microcontroller, any other type of processor, or any combination thereof. The control units 40 may include one or more elements operable to execute computer executable instructions or computer code embodied in the memory.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

Referring once again to FIGS. 1a and 1b, in the event of a thermal runaway, the battery pack 10 heats the fluid flowing through the hoses 25 faster than it is being cooled by the heat exchanger 35. The hottest point in the cooling loop is located where the fluid exits the battery pack (point H). When the fluid begins to boil at point H, the control unit 40 instructs the thermal management system 1 to change the flow pattern using first and second valves 45a, 45b located between the battery pack 10 and the heat exchanger 30 in order to force the fluid to flow through the energy recovery mechanism 15.

For the purpose of this disclosure, the terms "valve" may include any type of valve configured to allow flow in three or more directions. The valves may include, but not be limited to, expansion valves, pressure reducing valves, and back pressure regulators. The term "valves" is intended to indicate a plurality of valves in which each valve is independently selected to be an expansion valve, pressure reducing valve, or a back pressure regulator.

As shown in FIG. 1a, this change in flow direction may bring a steam turbine 50 into operation and force the fluid there through in order capture heat and cool the fluid (see FIG. 1a, dashed arrows). This steam engine 50 extracts work from the fluid and returns the fluid to a lower temperature. One skilled in the art will understand that upon the occurrence of the thermal runaway event, the energy recovery mechanism transforms the cooling loop 5 (solid arrows) into a Rankine cycle cooling loop 5&15 (dashed arrows). The higher operating temperature of the thermal management system 1 in this scenario may allow the heat exchanger to function normally with heat being transferred to the atmosphere.

The Rankine cycle cooling loop 5+15 is an idealized thermodynamic cycle of a heat engine that converts heat into mechanical work while undergoing a phase change. A Rankine cycle loop as shown in FIG. 1a is configured to recover "waste" heat from the core exhaust of an engine (e.g., turbofan or steam) and use it to produce electrical power to drive its own generator 55 or other electrical systems aboard the vehicle, e.g., aircraft. In other words, a Rankine cycle cooling loop represents a type of a recuperative system.

For the purpose of this disclosure, the term "battery pack" is used to refer to any type of electrical energy storage system that has the capability to be charged and discharged, such as a battery, capacitor or supercapacitor. In addition, these terms may refer to any of a variety of different cell types, chemistries and configurations including, but not limited to, lithium ion (e.g., lithium iron phosphate, lithium cobalt oxide, other lithium metal oxides, lithium ion polymer), nickel metal hydride, nickel cadmium, nickel hydrogen, nickel zinc, silver zinc batteries. The battery pack may comprise a single battery or multiple individual batteries contained within a housing that are electrically interconnected to achieve a desired voltage and capacity for the particular application.

Referring now to FIG. 1b, when the fluid begins to boil at point H, the control unit 40 instructs the thermal management system 1 to change the flow pattern using first and second valves 45a, 45b in order to force the fluid to flow through the energy recovery mechanism 15 as previously discussed above. However, in this case, instead of a steam engine (as shown in FIG. 1a), the change in flow direction forces the fluid to (see FIG. 1b, dashed arrows) flow across and make contact with a thermoelectric generator 51. In general, the thermoelectric generator 51 is a solid-state device that functions similar to a heat engine by absorbing heat and converting the heat flux (e.g., temperature difference) directly into electrical energy (+, −) via a phenomenon called the Seebeck or thermoelectric effect. The generated electrical energy may be supplied to an inverter 75 in order for this recovered energy to be used by other electrical components or machines aboard the vehicle. When desirable, the thermoelectric generator 51 may also be configured, such that it can be used to heat the battery 10 before startup or during storage.

Still referring to FIG. 1b, the thermoelectric generator 51 may comprise, without limitation, two dissimilar thermoelectric materials, namely, an n-type semiconductor 53n (negatively charged) and a p-type semiconductor 53p (positively charged), the ends of which are coupled to or in contact with a conductor 56 through which the generated electric current may travel. The semiconductor materials 53n, 53p and conductor 56 may be protected from direct contact with the fluid via encapsulation or presence of an insulation layer 54, including but not limited to a ceramic material. The semiconductor materials may comprise, without limitation alloys based on bismuth (Bi), antimony (Sb), tellurium (Te), selenium (Se), lead (Pb), silicon germanium (SiGe), or combinations thereof.

Figure 2:
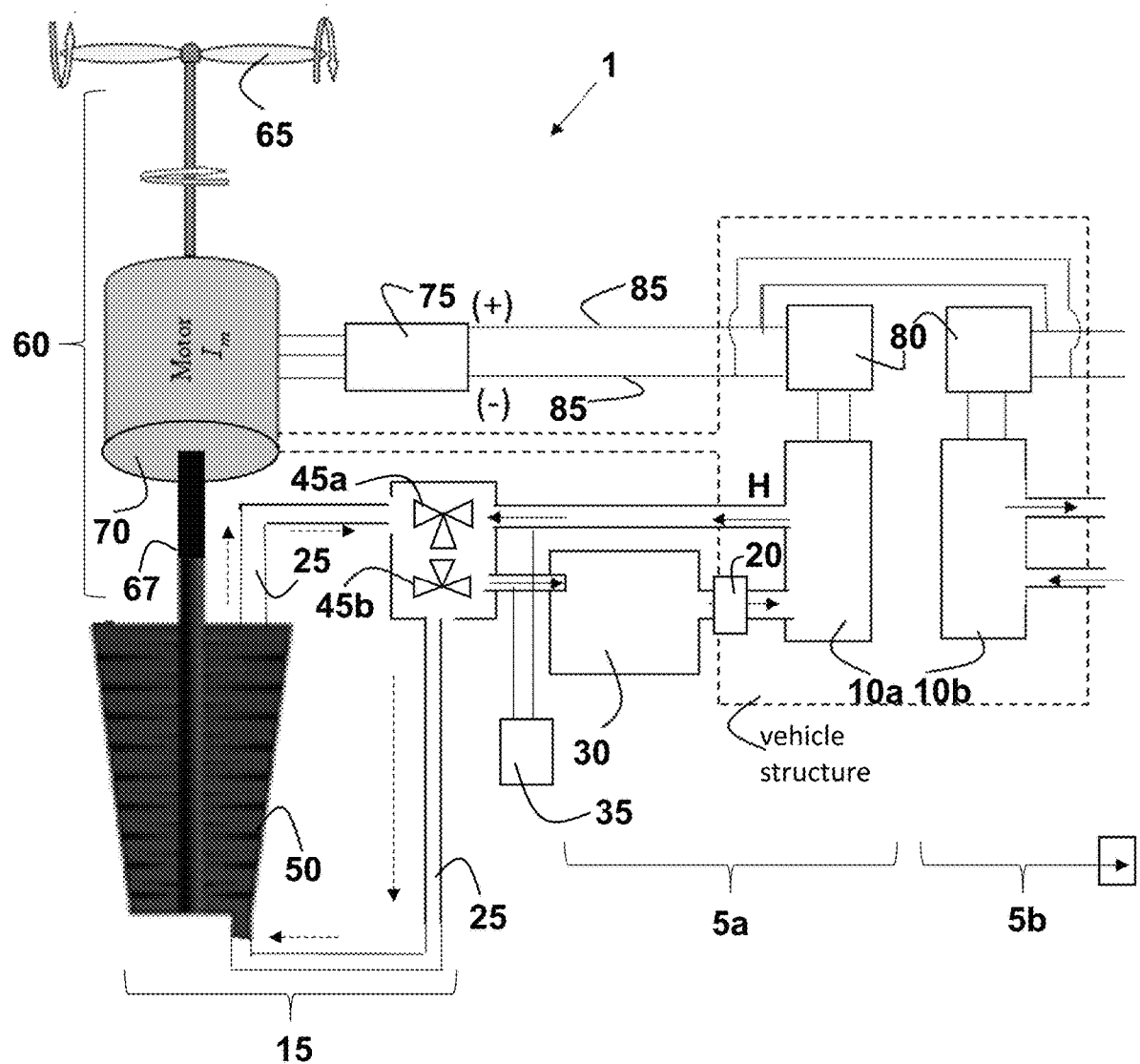
FIG. 2 is a schematic representation of yet another thermal management system constructed according to the teachings of the present disclosure.

Referring now to FIG. 2, one skilled in the art will understand that in order to conserve weight, a steam turbine 50 can be coupled directly to one of the existing electric machines or components 60, e.g., a propulsor, instead of having its own dedicated generator 55 (as shown in FIG. 1). The thermal management system 1 shown in FIG. 2 exhibits an architecture in which a steam turbine 50 is mounted opposite a propeller 65 on a propulsive motor 70. Upon the occurrence of a thermal runaway event, the steam turbine 50 directly drives the shaft 67 to which the propeller is attached. The electric motor 70 may then be used as a generator to provide electricity to the other propulsive motors. The electric motor 70 may be coupled to an inverter 75 necessary for the electrical power recovered to be utilized by other electrical components or machines aboard the vehicle.

A single battery pack may be used in a single motor system to provide thrust without electricity, and in a multipropulsor aircraft or tilt rotor with only one steam turbine using electric transmission to power the remaining propulsor or with multiple steam turbines. A ratio of 1:1 for steam turbine equipped propulsors and non-equipped propulsors allows the motor(s) acting as a generator to have the same electric power throughput as the motors that remain acting as conventional motors.

Referring once again to FIG. 2, a thermal management system 1 with multiple battery packs 10a, 10b may comprise isolated battery cooling loops 5a, 5b to allow one battery pack 10a to undergo a thermal runaway event without effecting the temperature or operation of the other battery pack 10b. However, when desirable the battery management systems (BMS) 80 may comprise electrical cross-ties 85(+), 85(−) to allow the remaining battery pack 10b to assist in regulating and distributing the power recovered from the energy recovery mechanism 15. When desirable, clutches and or a gearbox (not shown) may be placed between the turbine 50 and the propulsor 60 to eliminate losses from spinning the turbine dry during normal operation of the thermal management system 1 and to better align the turbine 50 operating speed with that of the propulsor 60 or other electric machines or components located aboard the vehicle.

Figure 3:
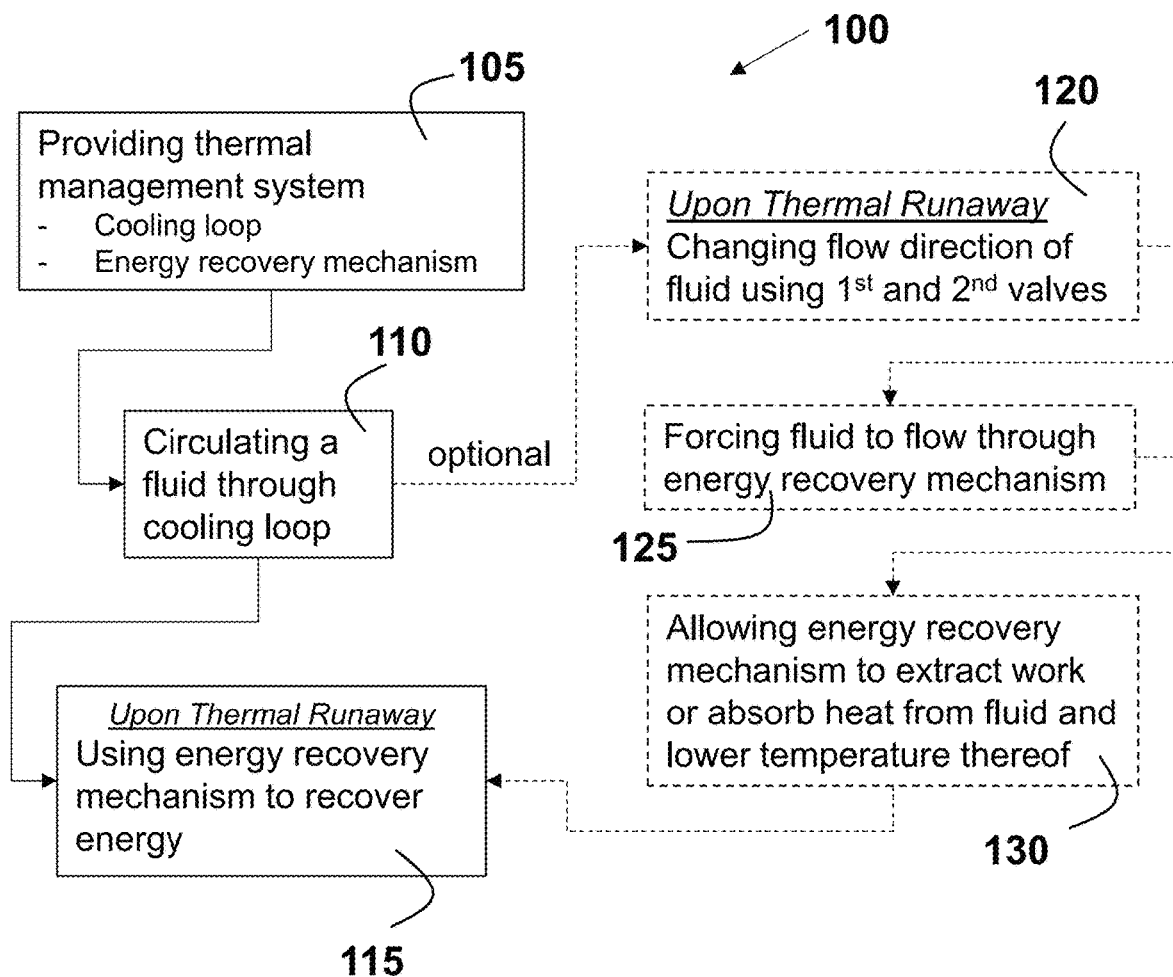
FIG. 3 is a flowchart of a method of regulating the dissipation of a thermal load during operation of a vehicle according to the teachings of the present disclosure.

According to another aspect of the present disclosure, a method of regulating the dissipation of a thermal load during operation of a vehicle is provided. Referring now to FIG. 3, this method 100 generally comprises providing 105 a thermal management system that includes one or more cooling loops and an energy recovery mechanism as described above and further defined herein; circulating 110 or forcing a fluid to flow through the cooling loop to regulate the temperature of at least one battery pack; and using 115 the energy recovery mechanism upon the occurrence of a thermal runaway event to recover an amount of energy that maintains the power level at or above the level exhibited by the battery pack prior to the occurrence of the thermal runaway event.

Upon the occurrence of the thermal runaway event, the battery pack heats the fluid faster than it is being cooled by the heat exchanger until the fluid that exits the battery pack is heated to the point of boiling. When this occurs, a thermal runaway event has been initiated and the method further comprises the steps of changing 120 the flow direction of the fluid at a first valve and a second valve located between the battery pack and the heat exchanger; forcing 125 the fluid to flow through a steam turbine or in contact with a thermoelectric generator; and allowing 130 the steam turbine to extract work or the thermoelectric generator absorb heat from the fluid, thereby returning the fluid to a lower temperature.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following Aspects:

1. A thermal management system to regulate the dissipation of a thermal load during operation of a vehicle, the thermal management system comprising:
   one or more cooling loops configured to regulate the temperature of at least one battery pack; and
   an energy recovery mechanism configured to recover energy dissipated upon the occurrence of a thermal runaway event;
   wherein the amount of energy recovered maintains the power level at or above the level exhibited by the battery pack prior to the occurrence of the thermal runaway event.
2. The system according to Aspect 1, wherein the cooling loop comprises:
   the battery pack, wherein the battery pack heats the fluid;
   a pump configured to force the fluid to flow through the cooling loop; and
   a heat exchanger, wherein the heat exchanger removes heat from the fluid;
   wherein the battery pack, the pump, and the heat exchanger are in fluid communication with each other and the fluid is circulated there through.
3. The system according to any of Aspects 1 or 2, wherein the energy recovery mechanism comprises a first valve, a second valve, and at least one of a steam turbine or a thermoelectric generator, that are in fluid communication with each other;
   wherein the first and second valve are located between the battery pack and the heat exchanger;
   wherein upon the occurrence of the thermal runaway event, the first and second valves change the flow direction of the fluid in order to force the fluid to flow through the steam turbine or in contact with the thermoelectric generator.
4. The system according to Aspect 3, wherein the steam turbine extracts work from the fluid, thereby returning the fluid to a lower temperature.
5. The system according to any of Aspects 1-4, wherein upon the occurrence of the thermal runaway event, the energy recovery mechanism transforms the cooling loop into a Rankine cycle loop.
6. The system according to any of Aspect 3, wherein the thermoelectric generator absorbs heat form the fluid and forms electrical energy through a Seebeck effect.
7. The system according to any of Aspects 3-5, wherein the steam turbine is coupled to one or more electric components incorporated within the vehicle or to its own dedicated generator.
8. The system according to Aspect 7, wherein the electric component incorporated within the vehicle is a propeller coupled to an electric motor.
9. The system according to any of Aspects 1-8, wherein the thermal management system comprises more than one battery pack with each battery pack coupled to separate battery pack cooling loops in order to allow one battery pack to undergo a thermal runaway event without effecting the temperature of the other battery pack.
10. The system according to Aspect 9, wherein the battery packs are electrically coupled to one another;
    wherein when one of the battery packs undergoes the occurrence of the thermal runaway event, the other battery pack assists in regulating and distributing the energy recovered from the steam engine.
11. A method of regulating the dissipation of a thermal load during operation of a vehicle, the method comprising:
    providing a thermal management system that comprises one or more cooling loops and an energy recovery mechanism,
    circulating a fluid through the cooling loop to regulate the temperature of at least one battery pack; and
    using the energy recovery mechanism upon the occurrence of a thermal runaway event to recover an amount of energy that maintains the power level at or above the level exhibited by the battery pack prior to the occurrence of the thermal runaway event.
12. The method according to Aspect 11, wherein the cooling loop comprises
    the battery pack, which heats the fluid;
    a pump configured to force the fluid to flow through the cooling loop; and
    a heat exchanger to remove heat from the fluid;
    wherein the battery pack, pump, and heat exchanger are in fluid communication with each other with the fluid being circulated there through.
13. The method according to any of Aspects 11 or 12, wherein upon the occurrence of the thermal runaway event, the battery pack heats the fluid faster than it is being cooled by the heat exchanger until the fluid that exits the battery pack is heated to the point of boiling.
14. The method according to Aspect 13, wherein the method further comprises
    changing the flow direction of the fluid at a first valve and a second valve located between the battery pack and the heat exchanger;
    forcing the fluid to flow through a steam turbine or in contact with the thermoelectric generator; and
    allowing the steam turbine to extract work or the thermoelectric generator absorb heat from the fluid, thereby returning the fluid to a lower temperature.
15. The method according to Aspect 14, wherein the steam engine is operated using a dedicated generator or an electrical component that is incorporated within the vehicle.
16. The method according to Aspect 15, wherein the electrical component incorporated within the vehicle is a propeller coupled to an electric motor.
17. The method according to Aspect 16, wherein the steam turbine directly drives the propeller and the electric motor is used as a generator to provide electricity to other propulsive motors.
18. The method according to any of Aspects 11-17, wherein the thermal management system comprises more than one battery pack with each battery pack coupled to separate battery pack cooling loops in order to allow one battery pack to undergo a thermal runaway event without effecting the temperature of the other battery pack.

19. The method according to Aspect 12, wherein the pump operates at a variable speed in order to maintain a predetermined temperature.

20. The method according to any of Aspects 11-19, wherein the thermal load is variable and has a minimal temperature limit;

wherein the thermal management system is constrained not to operate below the minimum temperature limit.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A thermal management system to regulate the dissipation of a thermal load during operation of a vehicle, the thermal management system comprising:
   one or more cooling loops comprising a pump, a heat exchanger, and at least one battery pack in fluid communication with each other, the one or more cooling loops being configured to regulate the temperature of the at least one battery pack; and
   an energy recovery mechanism comprising a first valve, a second valve, and at least one of a steam turbine or a thermoelectric generator in fluid communication with each other, wherein the first and second valves are located between the battery pack and the heat exchanger, the first and second valves being downstream of the battery pack and upstream of the heat exchanger, wherein the first valve is upstream of the least one of the steam turbine or the thermoelectric generator and the second valve is downstream of the at least one of the steam turbine or the thermoelectric generator, the energy recovery mechanism being configured to recover energy dissipated upon the occurrence of a thermal runaway event;
   wherein the amount of energy recovered maintains the power level at or above the level exhibited by the battery pack prior to the occurrence of the thermal runaway event.

2. The system according to claim 1, wherein the steam turbine extracts work from a fluid flowing through the energy recovery mechanism, thereby returning the fluid to a lower temperature.

3. The system according to claim 1, wherein upon the occurrence of the thermal runaway event, the energy recovery mechanism transforms the cooling loop into a Rankine cycle loop.

4. The system according to claim 1, wherein the thermoelectric generator absorbs heat from a fluid flowing through the energy recovery mechanism and forms electrical energy through a Seebeck effect.

5. The system according to claim 1, wherein the steam turbine is coupled to one or more electric components incorporated within the vehicle or to its own dedicated generator.

6. The system according to claim 5, wherein the electric component incorporated within the vehicle is a propeller coupled to an electric motor.

7. The system according to claim 1, wherein the thermal management system comprises more than one battery pack with each battery pack coupled to separate battery pack cooling loops in order to allow one battery pack to undergo a thermal runaway event without effecting the temperature of the other battery pack.

8. The system according to claim 7, wherein the battery packs are electrically coupled to one another;
   wherein when one of the battery packs undergoes the occurrence of the thermal runaway event, the other battery pack assists in regulating and distributing the energy recovered from the steam turbine.

9. A method of regulating the dissipation of a thermal load during operation of a vehicle, the method comprising:
   providing a thermal management system that comprises one or more cooling loops and an energy recovery mechanism, the one or more cooling loops comprising a pump, a heat exchanger, and at least one battery pack in fluid communication with each other, the energy recovery mechanism comprising a first valve, a second valve, and at least one of a steam turbine or a thermoelectric generator in fluid communication with each other, wherein the first and second valves are located between the battery pack and the heat exchanger, the first and second valves being downstream of the battery pack and upstream of the heat exchanger, wherein the first valve is upstream of the least one of the steam turbine or the thermoelectric generator and the second valve is downstream of the at least one of the steam turbine or the thermoelectric generator;
   circulating a fluid through the cooling loop to regulate the temperature of the at least one battery pack; and
   using the energy recovery mechanism upon the occurrence of a thermal runaway event to recover an amount of energy that maintains the power level at or above the level exhibited by the battery pack prior to the occurrence of the thermal runaway event.

10. The method according to claim 9, wherein upon the occurrence of the thermal runaway event, the battery pack heats the fluid faster than it is being cooled by the heat exchanger until the fluid that exits the battery pack is heated to the point of boiling.

11. The method according to claim 9, wherein the method further comprises:
    changing the flow direction of the fluid at the first valve and the second valve located between the battery pack and the heat exchanger;
    forcing the fluid to flow through the steam turbine or in contact with the thermoelectric generator; and
    allowing the steam turbine to extract work or the thermoelectric generator absorb heat from the fluid, thereby returning the fluid to a lower temperature.

12. The method according to claim 11, wherein the steam turbine is operated using a dedicated generator or an electrical component that is incorporated within the vehicle.

13. The method according to claim 12, wherein the electrical component incorporated within the vehicle is a propeller coupled to an electric motor.

14. The method according to claim 13, wherein the steam turbine directly drives the propeller and the electric motor is used as a generator to provide electricity to other propulsive motors.

15. The method according to claim 9, wherein the thermal management system comprises more than one battery pack with each battery pack coupled to separate battery pack cooling loops in order to allow one battery pack to undergo a thermal runaway event without effecting the temperature of the other battery pack.

16. The method according to claim 9, wherein the pump operates at a variable speed in order to maintain a predetermined temperature.

17. The method according to claim 9, wherein the thermal load is variable and has a minimal temperature limit;
   wherein the thermal management system is constrained not to operate below the minimum temperature limit.

* * * * *